(12) United States Patent
Hemmeter et al.

(10) Patent No.: US 9,309,395 B2
(45) Date of Patent: Apr. 12, 2016

(54) POLYPROPYLENE COMPOSITE

(71) Applicant: Borealis AG, Vienna (AT)

(72) Inventors: Markus Hemmeter, Linz (AT); Markus Gahleitner, Neuhofen/Krems (AT); Cornelia Tranninger, Pucking (AT); Petar Doshev, Linz (AT); Michael Jerabek, Leonding (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 14/421,612

(22) PCT Filed: Aug. 20, 2013

(86) PCT No.: PCT/EP2013/067336
§ 371 (c)(1),
(2) Date: Feb. 13, 2015

(87) PCT Pub. No.: WO2014/033017
PCT Pub. Date: Mar. 6, 2014

(65) Prior Publication Data
US 2015/0218355 A1    Aug. 6, 2015

(30) Foreign Application Priority Data

Aug. 27, 2012  (EP) .................................... 12181829

(51) Int. Cl.
*C08L 23/10* (2006.01)
*C08L 23/14* (2006.01)
*C08K 7/14* (2006.01)

(52) U.S. Cl.
CPC .............. *C08L 23/14* (2013.01); *C08L 23/142* (2013.01); *C08K 7/14* (2013.01); *C08L 2205/16* (2013.01)

(58) Field of Classification Search
CPC ....... C08L 23/142; C08L 23/14; C08L 51/06; C08L 2205/16; C08L 23/0869; C08K 7/14
See application file for complete search history.

(56) References Cited

U.S. PATENT DOCUMENTS

| | | | |
|---|---|---|---|
| 5,961,902 A | * | 10/1999 | Ishitoya et al. ........ B29C 31/044 156/79 |
| 2011/0100438 A1 | | 5/2011 | Gaston et al. |
| 2012/0225993 A1 | * | 9/2012 | Bernreitner et al. .... C08L 23/10 524/517 |
| 2013/0203930 A1 | * | 8/2013 | Schininger et al. . C08L 23/0869 524/523 |

FOREIGN PATENT DOCUMENTS

| | | |
|---|---|---|
| EP | 2308923 B1 | 5/2012 |
| WO | 2008074713 A1 | 6/2008 |
| WO | WO 2008/074715 * | 6/2008 |
| WO | 2011144703 A1 | 11/2011 |

OTHER PUBLICATIONS

Mitsuyoshi Fujiyama et al. "Effect of Molecular Parameters on the Shrinkage of Injection-Molded Polypropylene", Journal of Applied Polymer Science, vol. 22, 1225-1241 (1978).

* cited by examiner

*Primary Examiner* — Nathan M Nutter
(74) *Attorney, Agent, or Firm* — Tarolli, Sundheim, Covell & Tummino LLP

(57) ABSTRACT

Fiber reinforced composition comprising (a) a polypropylene random copolymer comprising ethylene and/or $C_4$ to $C_8$ α-olefin (PP-RACO), (b) fibers (F), and (c) a polar modified polypropylene as adhesion promoter (AP), wherein (i) the polypropylene random copolymer comprising ethylene and/or $C_4$ to $C_8$ α-olefin (PP-RACO) heaving a melt flow rate $MFR_2$ (230° C.) measured according to ISO 1133 of at least 5 g/10 min, (ii) the fibers (F) are selected from the group consisting of glass fibers, metal fibers, ceramic fibers and graphite fibers, and (iii) the polymer contained in the reinforced composition forms a continuous phase being the matrix of the fiber reinforced composition.

11 Claims, 1 Drawing Sheet

POLYPROPYLENE COMPOSITE

The present invention relates to a fiber reinforced composition as well as articles formed therefrom.

Polypropylene is a material used in a wide variety of technical fields, and reinforced polypropylenes have in particular gained relevance in fields previously exclusively relying on non-polymeric materials, in particular metals. One particular example of reinforced polypropylenes are glass fiber reinforced polypropylenes. Such materials enable a tailoring of the properties of the composition by selecting the type of polypropylene, the amount of glass fiber and sometimes by selecting the type of coupling agent used. Accordingly, nowadays glass-fiber reinforced polypropylene is a well-established material for applications requiring high stiffness, heat deflection resistance and resistance to both impact and dynamic fracture loading (examples include automotive components with a load-bearing function in the engine compartment, support parts for polymer body panels, washing machine and dishwasher components). However one drawback of the commercial available fiber reinforced material is its limited flowability and processability. The fact that there is a clear negative correlation between glass fiber content (usually ranging between 10 and 40 wt.-%) and flowability (MFR) makes the forming of thin-wall or otherwise delicate parts difficult or impossible.

There is a need in the art to have polypropylene (PP) grades combining a very high stiffness level typically achieved with glass fibre (GF) compounds with an increased tenacity. A key parameter in this context is the strain at break (or elongation at break, $\epsilon_B$) which normally is at a very low level, i.e. <3.0%) for PP/GF grades.

This goal is generally considered to be difficult to achieve because the coupling in PP/GF composites achieved by a chemical reaction between the GF sizing (surface coating) and the normally applied adhesion promoter is limiting the deformation of the matrix polymer. The limit in deformation becomes even stronger with increasing glass fiber content, but the coupling quality on the other hand is decisive for the stiffness and impact resistance (toughness) of the material.

Due to legislation requirements in Carbon emission reduction and the need for economical engines it is a special interest in automotive industry to validate all kinds of lightweight potential. Potential fields of interest include substitution of "high-density materials" by replacing with lighter sources or slimming down the relevant part weight. One approach hereby is the use of either chemical or physical foaming. For successful foaming of relevant applications, like instrumental carriers, shrouds, structural carriers, on top to the foaming reactivity it is desired to have good flowabilty of the used plastics in order to match thin walled pre-filling and having low stress levels in the part to allow proper and constant foam building and filling the required wall-thicknesses.

Fujiyama M. and Kimura S. describe in "Effect of Molecular Parameters on the Shrinkage of Injection-Molded Polypropylene" (J. Appl. Polym. Sci. 22 (1978) 1225-1241) compositions of PP homopolymers, random and impact copolymers with glass fibres which have been investigated in terms of shrinkage. The polymers are characterized very superficially only, and the glass fibres not at all; mechanical data are missing.

WO 98/16359 A1 describes rod-shaped PP pellets containing glass and PP fibers, the fibers having the length of the pellets. The core contains a mixture of GF with PP fibers, the fibers being a PP homopolymer or a random copolymer with ≤10 wt % C2 or C4-C10 as comonomer, while the sheath comprises a PP homopolymer and/or a random copolymer with ≤10 wt % C2 or C4-C10 as comonomer and/or a PP impact copolymer with ≤27 wt % C2 or C4-C10 as comonomer.

EP 2062936 A1 describes PP glass fiber compositions with >15 wt % glass fibers and a heterophasic PP composition comprising a matrix phase and at least two disperse elastomer components with a total comonomer content of ≥12 wt % and a comonomer content in the elastomer phase of ≥20 wt %.

EP 2308923 B1 describes fiber reinforced compositions comprising (a) an EP-heterophasic copolymer, (b) a PP homo- or copolymer with MFR ≥500, and (c) fibers having good flowability.

Accordingly, the object of the present invention is to provide a fiber reinforced composition with excellent flowability and good elongation at break. It is further an object of the present invention to obtain a good balance of mechanical properties, like flexural modulus, impact strength and elongation at break. Moreover, it is an object of the present invention to improve the production process by making it more effective, i.e. no need of a mixture of multiple different polymers involved.

The finding of the present invention is that a fibrous reinforcing material with excellent mechanical and processing properties can be obtained with fibers embedded in a monophasic ethylene propylene random copolymer.

Therefore the present invention is directed to a fiber reinforced composition comprising
(a) a polypropylene random copolymer comprising ethylene and/or $C_4$ to $C_8$ α-olefin (PP-RACO),
(b) fibers (F), and
(c) a polar modified polypropylene as adhesion promoter (AP),
wherein
(i) the polypropylene random copolymer comprising ethylene and/or $C_4$ to $C_8$ α-olefin (PP-RACO) having a melt flow rate $MFR_2$ (230° C.) measured according to ISO 1133 of at least 5 g/10 min,
(ii) the fibers (F) are selected from the group consisting of glass fibers, metal fibers, mineral fibers, ceramic fibers and graphite fibers,
(iii) the complete polymer contained in the reinforced composition forms a continuous phase being the matrix of the fiber reinforced composition.

It should be noted that the polypropylene random copolymer comprising ethylene and/or $C_4$ to $C_8$ α-olefin (PP-RACO) has a melt flow rate $MFR_2$ (230° C.) of at least 5 g/10 min. Preferably, the melt flow rate $MFR_2$ (230° C.) is at least 7 g/10 min, more preferably at least 10 g/10 min, yet more preferably at least 12 g/10 min. The upper limit of the melt flow rate $MFR_2$ (230° C.) is preferably not more than 500 g/10 min, more preferably not more than 250 g/10 min, yet more preferably not more than 150 g/10 min. It is to be understood that each upper limit may be combined with each lower limit. Accordingly it is especially preferred that the polypropylene random copolymer comprising ethylene and/or $C_4$ to $C_8$ α-olefin (PP-RACO) has a melt flow rate $MFR_2$ (230° C.) in the range of 5 to 500 g/10 min, more preferably in the range of 7 to 250 g/10 min, still more preferably in the range of 10 to 150 g/10 min.

It is also possible that more than one sort of PP-RACO is used, as long as all used PP-RACOs form one single phase, and as long as the complete monophase fulfills the physical and chemical requirements as described herein for the polypropylene random copolymer comprising ethylene and/or $C_4$ to $C_8$ α-olefin (PP-RACO). However it is especially preferred that just one sort of PP-RACO is used in the present fiber reinforced composition.

In a further embodiment of the fiber reinforced composition, the polypropylene random copolymer (PP-RACO) comprises 1.0 to 8.0 wt.-% of ethylene and/or $C_4$ to $C_8$ α-olefin. The upper limit of the ethylene and/or $C_4$ to $C_8$ α-olefin content is 8.0 wt.-%, 7.0 wt.-%, 6.0 wt.-%, 5.0 wt.-%, 4.6 wt.-%. The lower limit of the ethylene and/or $C_4$ to $C_8$ α-olefin content is 0.5 wt.-%, 1.0 wt.-%, 1.2 wt.-%, 1.3 wt.-%, or 1.4 wt.-%. It is to be understood that each upper limit may be combined with each lower limit, resulting e.g. in a range of 0.5 to 8.0 wt.-%, more preferably in a range of 1.0 wt.-% to 6.0 wt.-%, still more preferably in a range of 1.0 to 5.0 wt.-%, like in a range of 1.5 to 4.6 wt.-%.

In a further embodiment, the polypropylene random copolymer (PP-RACO) has a monomodal, bimodal or multimodal molecular weight or comonomer distribution.

In one embodiment, the polypropylene random copolymer (PP-RACO) has a monomodal or bimodal molecular weight or comonomer distribution.

In one embodiment, the polypropylene random copolymer (PP-RACO) has a monomodal molecular weight or comonomer distribution.

In one embodiment, the polypropylene random copolymer (PP-RACO) has a bimodal molecular weight or comonomer distribution.

In one embodiment, the polypropylene random copolymer (PP-RACO) has a multimodal molecular weight or comonomer distribution.

In one embodiment, the polypropylene random copolymer (PP-RACO) has a xylene cold soluble content (XCS) of not more than 20 wt.-%, preferably not more than 15 wt.-%, still more preferably not more than 12 wt.-%, such as 1.0 to 20 wt.-%, 1.2 to 15 wt.-%, 1.4 to 15 wt.-%, 1.5 to 12 wt.-%.

It should be noted that present invention is directed to fiber reinforced compositions in which the polymer phase forms a continuous phase being the matrix for the fibers. Hence, the polymer forming the matrix for the fibers in the composition is monophasic. The polymer phase does not contain elastomeric (co)polymers forming inclusions as a second phase for improving mechanical properties of the composite, such as elongation at break. A polymer phase containing elastomeric (co)polymers as insertions of a second phase would by contrast be called heterophasic and is not part of the present invention. Hence the present invention does not define a fiber reinforced composition comprising a heterophasic propylene copolymer. Such fiber reinforced compositions are excluded from the present invention. Thus fiber reinforced composition according the instant invention defines a matrix for fibers which is monophasic.

The desired mechanical properties of the fiber reinforced composite are hence essentially controlled by the polypropylene random copolymer comprising ethylene and/or $C_4$ to $C_8$ α-olefin (PP-RACO) in combination with the adhesion promoter (AP) improving the adhesion an insertion of the fibers. It is believed that the polymer of such composite forms a continuous phase. Further insertions of second or more elastomer phases aiming to improve the same mechanical properties are excluded.

Essential components of the present fiber reinforced composition are the fibers (F). Preferably the fibers (F) are selected from the group consisting of glass fibers, metal fibers, mineral fibers, ceramic fibers and graphite fibers. Glass fibers are preferred. In particular, the glass fibers are cut glass fibers, also known as short fibers or chopped strands.

The cut or short glass fibers used in the fiber reinforced composition preferably have an average length of from 1 to 10 mm, more preferably from 1 to 7 mm, for example 3 to 5 mm, or 4 mm. The cut or short glass fibers used in the fiber reinforced composition preferably have an average diameter of from 8 to 20 µm, more preferably from 9 to 16 µm, for example 10 to 15 µm.

Preferably, the fibers (F) have an aspect ratio of 125 to 650, preferably of 150 to 450, more preferably 200 to 400, still more preferably 250 to 350. The aspect ratio is the relation between average length and average diameter of the fibers.

The polar modified polypropylene as adhesion promoter (AP) is applied in order to achieve a chemical reaction between the glass fibers and the adhesion promoter. As a result, the glass fibers can be easier and more uniformly dispersed in the polymer matrix.

In a further embodiment, the overall melt flow rate $MFR_2$ (230° C.), i.e. the melt flow rate of the fiber reinforced composite is at least 2.0 g/10 min. In one embodiment, the overall melt flow rate $MFR_2$ (230° C.) is at least 3.0 g/10 min. An upper limit may be given as 100 g/10 min. Accordingly it is preferred that the fiber reinforced composition has a melt flow rate $MFR_2$ (230° C.) in the range of 2.0 to 100 g/10 min, more preferably in the range of 3.0 o 70 g/10 min, still more preferably in the range of 3.5 to 50 g/10 min, like in the range of 4.0 to 35 g/10 min.

In a further embodiment, the overall tensile modulus, i.e. the tensile modulus of the fiber reinforced composite, is at least 5,000 MPa, in one embodiment, the tensile modulus of the fiber reinforced composite is at least 5,500 MPa, in a further embodiment, the tensile modulus of the fiber reinforced composite is at least 6,000 MPa.

The upper limit of the tensile modulus of the fiber reinforced composite may be 9,000 MPa. Accordingly it is preferred that the overall tensile modulus, i.e. the tensile modulus of the fiber reinforced composite, is in the range of 5,000 to 9,000 MPa, more preferably in the range of 5,500 to 8,800 MPa, yet more preferably in the range of 6,000 to 8,700 MPa.

A further embodiment relates to a fiber reinforced composition as described above, wherein the composition comprises
(a) 30 to 75 wt.-% of a polypropylene random copolymer comprising ethylene and/or $C_4$ to $C_8$ α-olefin (PP-RACO), preferably 40 to 70 wt.-%, more preferably 45 to 70 wt.-%, for example 49 to 69 wt.-%,
(b) 20 to 45 wt.-% fibers (F), preferably 25 to 45 wt.-%, more preferably 26 to 40 wt.-%, for example 30 to 40 wt.-%, and
(c) 0.5 to 5.0 wt.-% of a polar modified polypropylene as adhesion promoter (AP), preferably 1.0 to 4.0 wt.-%, more preferably 1.0 to 3.0 wt.-%, for example 1.1 to 2.9 wt.-%, based on the total weight of the fiber reinforced composition.

It has to be noted that the embodiments as described above can be combined with each other, including the described upper and lower ranges. For instance, the fiber reinforced composition with the following features would be a further embodiment of the invention:

A fiber reinforced composition comprising
(a) 30 to 75 wt.-%, preferably 40 to 70 wt.-%, more preferably 45 to 70 wt.-%, for example 49 to 69 wt.-%, of a polypropylene random copolymer comprising ethylene and/or $C_4$ to $C_8$ α-olefin (PP-RACO)
(b) 20 to 45 wt.-%, preferably 25 to 45 wt.-%, more preferably 26 to 40 wt.-%, for example 30 to 40 wt.-%, of fibers (F) and
(c) 0.5 to 5.0 wt.-%, preferably 1.0 to 4.0 wt.-%, more preferably 1.0 to 3.0 wt.-%, for example 1.1 to 2.9 wt.-%, of a polar modified polypropylene as adhesion promoter (AP), preferably said polar modified polypropylene is propylene polymer grafted with maleic anhydride,
based on the total weight of the fiber reinforced composition, preferably based on the total amount of polypropylene random copolymer (PP-RACO), fibers (F) and the adhesion promoter (AP) together, wherein
(i) the polypropylene random copolymer (PP-RACO) having an ethylene and/or $C_4$ to $C_8$ α-olefin content of 1.1 wt.-% to 4.-9 wt %, a melt flow rate $MFR_2$ (230° C.) measured according to ISO 1133 of at least 10 g/10 min and a monomodal or bimodal molecular weight or comonomer distribution,
(ii) the fibers (F) are selected from the group consisting of glass fibers heaving an aspect ratio of 150 to 450,
(iii) the complete polymer contained in the reinforced composition forms a continuous phase being the matrix of the fiber reinforced composition.

The present invention will now be described in more detail. Further preferred embodiments according to the present invention can be taken from the appended claims.

It is apparent from the wording "the complete polymer contained in the reinforced composition forms a continuous phase being the matrix of the fiber reinforced composition" that present invention is directed to fiber reinforced compositions in which the polymer phase forms a continuous phase being the matrix for the fibers. Hence, the polymer forming the matrix for the fibers in the composition is monophasic. The desired mechanical properties of the fiber reinforced composite are hence essentially controlled by the polypropylene random copolymer (PP-RACO) in combination with the adhesion promoter (AP) improving the adhesion and insertion of the fibers. It is believed that the polymer of such composite forms a continuous phase. Further insertions of elastomer phases aiming to improve the same mechanical properties are excluded.

Preferably the fibers (F) are dispersed individually within the final matrix of the fiber reinforced composition.

Further it is desired that the fiber reinforced composition has a high melt flow rate which is high enough to allow good processability. Accordingly, it is preferred that in the present invention the fiber reinforced composition has an $MFR_2$ (230° C.) of at least at least 3.0 g/10 min. An upper limit may be given as 100 g/10 min. Accordingly it is preferred that the fiber reinforced composition has a melt flow rate $MFR_2$ (230° C.) in the range of 2.0 to 100 g/10 min, more preferably in the range of 3.0 o 70 g/10 min, still more preferably in the range of 3.5 to 50 g/10 min, like in the range of 4.0 to 35 g/10 min.

As will be explained in detail below the polypropylene random copolymer (PP-RACO) can be unimodal or multimodal, like bimodal, in view of the molecular weight distribution and/or the comonomer content distribution.

Thus expression "multimodal" or "bimodal" used herein refers to the modality of the polymer, i.e.
the form of its molecular weight distribution curve, which is the graph of the molecular weight fraction as a function of its molecular weight, and/or
the form of its comonomer content distribution curve, which is the graph of the comonomer content as a function of the molecular weight of the polymer fractions.

As will be explained below, the polypropylene random copolymer (PP-RACO) can, if it is of multimodal or bimodal character, be produced by blending different polymer types, i.e. of different molecular weight and/or comonomer content. However, it is preferred that the polypropylene random copolymer (PP-RACO) is produced in a sequential multi-step process, using reactors in serial configuration and operating at different reaction conditions. As a consequence, each fraction prepared in a specific reactor will have its own molecular weight distribution and/or comonomer content distribution. When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly in case of a bimodal system, in particular in view of the comonomer content, the split of the two fractions is roughly 50:50. Thus in one embodiment the polypropylene random copolymer (PP-RACO) comprises two fractions which differ in their comonomer content, like ethylene content, wherein the first fraction is present from 40 to 60 wt.-% and the second fraction from 60 to 40 wt.-%.

The polypropylene random copolymer (PP-RACO) may be produced in a polymerization stage effected in one or more polymerization reactors. Desirably the polypropylene random copolymer (PP-RACO) comprising two or more different propylene copolymers may be produced by carrying out polymerization in two or more different polymerisation reactors (e.g. bulk and/or gas phase reactors; as bulk reactors, loop reactors are preferred) to generate polymers of the different desired molecular weight distributions or comonomer make ups in the different polymerization reactors.

The polypropylene random copolymer (PP-RACO) comprises, preferably consists of, ethylene and/or at least one $C_4$ to $C_8$ α-olefin, preferably at least one α-olefin selected from the group consisting of ethylene, 1-butene, 1-pentene, 1-hexene and 1-octene, more preferably ethylene and/or 1-butene, yet more preferably ethylene.

Preferably the polypropylene random copolymer (PP-RACO) has a melting temperature Tm measured according to ISO 11357-3 of at least 135° C., more preferably of at least 140° C., yet more preferably in the range of 135 to 160° C., still more preferably in the range of 140 to 156° C.

Further it is appreciated that the units derived from ethylene and $C_4$ to $C_8$ α-olefins within the polypropylene random copolymer (PP-RACO) are randomly distributed. The randomness indicates the amount of isolated comonomer units, i.e. those which have no other comonomer units in the neighbourhood, compared to the total amount of comonomers in the polymer chain. In a preferred embodiment, the randomness of the polypropylene random copolymer (PP-RACO) is at least 30%, more preferably at least 50%, even more preferably at least 60%, and still more preferably at least 65%.

The fiber reinforced composition also comprises an adhesion promoter (AP).

The adhesion promoter (AP) preferably comprises a modified (functionalized) polymer and optionally a low molecular weight compound having reactive polar groups. Modified α-olefin polymers, in particular propylene homopolymers and copolymers, like copolymers of ethylene and propylene with each other or with other α-olefins, are most preferred, as they are highly compatible with the polymers of the fiber reinforced composition. Modified polyethylene can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to using a propylene polymer grafted with maleic anhydride as the modified polymer, i.e. as the adhesion promoter (AP).

The modified polymer, i.e. the adhesion promoter (AP), can be produced in a simple manner by reactive extrusion of the polymer, for example with maleic anhydride in the presence of free radical generators (like organic peroxides), as disclosed for instance in EP 0 572 028.

Preferred amounts of groups deriving from polar compounds in the modified polymer, i.e. the adhesion promoter (AP), are from 0.5 to 3.0 wt.-%, more preferably from 0.5 to 4.0 wt.-%, still more preferably from 0.5 to 3.0 wt.-%.

Preferred values of the melt flow rate $MFR_2$ (230° C.) for the modified polymer, i.e. for the adhesion promoter (AP), are from 1.0 to 500 g/10 min.

The instant composition may additionally contain typical other additives useful for instance in the automobile sector, like carbon black, other pigments, antioxidants, UV stabilizers, nucleating agents, antistatic agents and slip agents, in amounts usual in the art.

Hence, another embodiment of the invention is a fiber reinforced composition consisting of
(a) a polypropylene random copolymer comprising ethylene and/or $C_4$ to $C_8$ α-olefin (PP-RACO),
(b) fibers (F), and
(c) a polar modified polypropylene as adhesion promoter (AP),
(d) optionally a masterbatch, and
(e) optionally one or more additives,
wherein
(i) the polypropylene random copolymer comprising ethylene and/or $C_4$ to $C_8$ α-olefin (PP-RACO) has a melt flow rate $MFR_2$ (230° C.) measured according to ISO 1133 of at least 5 g/10 min,
(ii) the fibers (F) are selected from the group consisting of glass fibers, metal fibers, mineral fibers, ceramic fibers and graphite fibers,
(iii) the complete polymer contained in the reinforced composition forms a continuous phase being the matrix of the fiber reinforced composition.

A further embodiment of present invention is a fiber reinforced composition consisting of
(a) 30 to 75 wt.-%, preferably 40 to 70 wt.-%, more preferably 45 to 70 wt.-%, still more preferably 49 to 69 wt.-%, of a polypropylene random copolymer comprising ethylene and/or $C_4$ to $C_8$ α-olefin (PP-RACO),
(b) 20 to 45 wt.-%, preferably 25 to 45 wt.-%, more preferably 26 to 40 wt.-%, still more preferably 30 to 40 wt.-%, of fibers (F) and
(c) 0.5 to 5.0 wt.-% of a polar modified polypropylene as adhesion promoter (AP), preferably 1.0 to 4.0 wt.-%, more preferably 1.0 to 3.0 wt.-%, for example 1.1 to 2.9 wt.-%,
(d) 0.0 to 3.0 wt.-% of a masterbatch, and
(e) 0.0 to 3.0 wt.-% of one or more additives,
based on the total weight of the fiber reinforced composition, wherein
(i) the polypropylene random copolymer comprising ethylene and/or $C_4$ to $C_8$ α-olefin (PP-RACO) heaving a melt flow rate $MFR_2$ (230° C.) measured according to ISO 1133 of at least 5 g/10 min,
(ii) the fibers (F) are selected from the group consisting of glass fibers, metal fibers, mineral fibers, ceramic fibers and graphite fibers,
(iii) the complete polymer contained in the reinforced composition forms a continuous phase being the matrix of the fiber reinforced composition.

It is to be understood that all the combinations as described above are applicable for these embodiments as well.

Additives in this meaning are for example carbon black, other pigments, antioxidants, UV stabilizers, nucleating agents, antistatic agents and slip agents.

The term masterbatch means polymer-bound additives, for instance color and additive concentrates physically or chemically bound onto or into polymers. It is appreciated that such masterbatches contain as less polymer as possible.

The polymerization system for the preparation of the polypropylene random copolymer (PP-RACO) can comprise one or more conventional stirred slurry reactors and/or one or more gas phase reactors. Preferably the reactors used are selected from the group of loop and gas phase reactors and, in particular, the process employs at least one loop reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below, comprising the Ziegler-Natta procatalyst, the external donor and the cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the polypropylene random copolymer (PP-RACO) according to this invention is produced by using a special Ziegler-Natta procatalyst in combination with a special external donor, as described below in detail, preferably in the Spheripol® or in the Borstar®-PP process.

One preferred multistage process may therefore comprise the steps of:
producing a polypropylene random copolymer (PP-RACO) in the presence of the chosen catalyst system, as for instance described in detail below, comprising the special Ziegler-Natta procatalyst (i), an external donor (iii) and the cocatalyst (ii) in a first slurry reactor and optionally in a second slurry reactor, both slurry reactors using the same polymerization conditions,
optionally transferring the slurry reactor product into at least one first gas phase reactor, like one gas phase reactor or a first and a second gas phase reactor connected in series,
recovering the polymer product for further processing.

With respect to the above-mentioned preferred slurry or slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is optionally transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the polypropylene random copolymer (PP-RACO) is obtained by a polymerization process as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

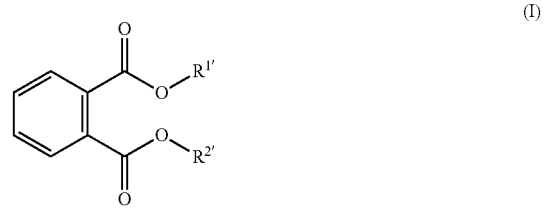

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor, c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of adding to said titanized carrier
(i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

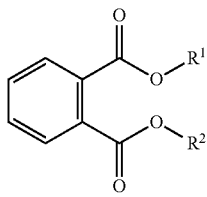

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620. This crystallized adduct is preferably used as the catalyst carrier and reacted to the procatalyst useful in the present invention as described in WO 92/19658 and WO 92/19653.

As the catalyst residue is removed by extracting, an adduct of the titanized carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2 wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

In one preferred embodiment the procatalyst is obtained by the emulsion technology developed by *Borealis*. Reference in this regard is made to WO 2009/040201. Thus preferably the procatalyst is obtained by a process comprising the steps of:
a) preparing a solution of a complex of a Group 2 metal and an electron donor by reacting a compound of said metal with said electron donor or a precursor thereof in an organic liquid reaction medium;
b) adding said solution of said complex to at least one compound of a transition metal of any of groups 4-6 to produce an emulsion the dispersed phase of which contains more than 50 mol % of the Group 2 metal in said complex;
c) agitating the emulsion, optionally in the presence of an emulsion stabilizer, in order to maintain the droplets of said dispersed phase within an average particle size range of suitably 5 to 200 μm, preferably 10 to 100 μm, even more preferably 20 to 50 μm;
d) solidifying said droplets of the dispersed phase; and
e) recovering the obtained solidified particles of the olefin polymerisation catalyst.

The Group 2 metal used in the preparation of the procatalyst according to the emulsion technology is preferably magnesium and the liquid organic medium for reacting the group 2 metal compound preferably comprises a $C_6$-$C_{10}$ aromatic hydrocarbon, preferably toluene. An electron donor compound to be reacted with the Group 2 metal compound preferably is a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferably dioctyl phthalate or bis-(2-ethylhexyl) phthalate. The reaction for the preparation of the Group 2 metal complex is generally carried out at a temperature of 20 to 80° C., and in case that the Group 2 metal is magnesium, the preparation of the magnesium complex may advantageously be carried out at a temperature of 50 to 70° C. The compound of a group 4-6 metal is preferably a compound of a Group 4 metal. The Group 4 metal is preferably titanium, and its compound to be reacted with the complex of a Group 2 metal is preferably a halide. In a still further embodiment of the invention, the compound of a group 4-6 metal can also be selected from Group 5 and Group 6 metals, such as Cu, Fe, Co, Ni and/or Pd compounds. In a preferred embodiment of the production process of the catalyst a turbulence minimizing agent (TMA) is added to the reaction mixture before solidifying said particles of the dispersed phase, the TMA being inert and soluble in the reaction mixture under the reaction conditions. The turbulence minimizing agent (TMA) or mixtures thereof are preferably polymers having linear aliphatic carbon backbone chains, which might be branched with only short side chains in order to serve for uniform flow conditions when stirring. Said TMA is in particular preferably selected from α-olefin polymers having a high molecular weight Mw (as measured by gel permeation chromatography) of about 1 to 40×$10^6$, or mixtures thereof. Especially preferred are polymers of α-olefin monomers with 6 to 20 carbon atoms, and more preferably polyoctene, polynonene, polydecene, polyundecene or polydodecene or mixtures thereof, having the molecular weight and general backbone structure as defined before, and most preferably TMA is polydecene. Usually, said turbulence minimizing agent can be added in any process step before particle formation starts, i.e. at the latest before solidification of the emulsion, and is added to the emulsion in an amount of 1 to 1000 ppm, preferably 5 to 100 ppm and more preferable 5 to 50 ppm, based on the total weight of the reaction mixture. A preferred embodiment of the present invention procatalyst is obtained by: preparing a solution of a magnesium complex by reacting an alkoxy magnesium compound and an electron donor or precursor thereof in a $C_6$-$C_{10}$ aromatic liquid reaction medium comprising $C_6$-$C_{10}$ aromatic hydrocarbon or a mixture of $C_6$-$C_{10}$ aromatic hydrocarbon and $C_5$-$C_9$ aliphatic hydrocarbon; reacting said magnesium complex with a compound of at least one fourvalent group 4 metal at a temperature greater than 10° C. and less than 60° C., to produce an emulsion of a denser, $TiCl_4$/toluene-insoluble, oil dispersed phase having group 4 metal/Mg mol ratio 0.1 to 10 in an oil disperse phase having group 4 metal/Mg mol ratio 10 to 100; maintaining the droplets of said dispersed phase within the size range 5 to 200 μm by agitation in the presence of an emulsion stabiliser while heating the emulsion to solidify said droplets and adding turbulence minimising agent into the reaction mixture before solidifying said droplets of the dispersed phase, said turbulence minimising agent being inert and soluble in the reaction mixture under the reaction conditions; and solidifying said particles of the dispersed phase by heating and recovering the obtained catalyst particles. The said disperse and dispersed phases are thus distinguishable from one another by the fact that the denser oil, if contacted with a solution of titanium tetrachloride in toluene, will not dissolve in it. A suitable TiCl$_4$/toluene solution for establishing this criterion would be one having a TiCl$_4$/toluene mol ratio of 0.1 to 0.3. The disperse and dispersed phase are also distinguishable by the fact that the great preponderance of the Mg provided (as complex) for the reaction with the Group 4 metal compound is present in the dispersed phase, as revealed by comparison of the respective Group 4 metal/Mg mol ratios. In effect, therefore, virtually the entirety of the reaction product of the Mg complex with the Group 4 metal, which is the precursor of the final catalyst, becomes the dispersed phase, and proceeds through the further processing steps to the final dry particulate form. The disperse phase, still containing a useful quantity of Group 4 metal, can be reprocessed for recovery of that metal. The production of a two-phase, rather than single-phase reaction product is encouraged by carrying out the Mg complex/Group 4 metal compound reaction at low temperature, specifically above 10° C. but below 60° C., preferably between 20° C. and 50° C. Since the two phases will naturally tend to separate into a lower, denser phase and supernatant lighter phase, it is necessary to maintain the reaction product as an emulsion by agitation, preferably in the presence of an emulsion stabiliser. The resulting particles from the dispersed phase of the emulsion are of a size, shape (spherical) and uniformity which render the final catalyst extremely effective in olefin polymerisation. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables which affect these events. The electron donor is preferably an aromatic carboxylic acid ester, particularly favoured esters being dioctyl phthalate and bis-(2-ethylhexyl) phthalate. The donor may conveniently be formed in situ by reaction of an aromatic carboxylic acid chloride precursor with a $C_2$-$C_{16}$ alkanol and/or diol. The liquid reaction medium preferably comprises toluene. Furthermore, emulsifying agents/emulsion stabilisers can be used additionally in a manner known in the art for facilitating the formation and/or stability of the emulsion. For the said purposes e. g. surfactants, e. g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$-$C_{20}$ acrylates such as poly (hexadecyl)-methacrylate and poly(octadecyl)-methacrylate. It has been found that the best results are obtained when the Group 4 metal/Mg mol ratio of the denser oil is 1 to 5, preferably 2 to 4, and that of the disperse phase oil is 55 to 65. Generally the ratio of the mol ratio Group 4 metal/Mg in the disperse phase oil to that in the denser oil is at least 10. Solidification of the dispersed phase droplets by heating is suitably carried out at a temperature of 70-150° C., usually at 90-110° C.

The finally obtained procatalyst is desirably in the form of particles having an average size range of 5 to 200 μm, preferably 10 to 100 μm, more preferably 20 to 50 μm. The reagents can be added to the aromatic reaction medium in any order. However it is preferred that in a first step the alkoxy magnesium compound is reacted with a carboxylic acid halide precursor of the electron donor to form an intermediate; and in a second step the obtained product is further reacted with the Group 4 metal. The magnesium compound preferably contains from 1 to 20 carbon atoms per alkoxy group, and the carboxylic acid should contain at least 8 carbon atoms. Reaction of the magnesium compound, carboxylic acid halide and alcohol proceeds satisfactorily at temperatures in the range 20 to 80° C., preferably 50 to 70° C. The product of that reaction, the "Mg complex", is reacted with the Group 4 metal compound at a lower temperature, to bring about the formation of a two-phase, oil-in-oil, product. The reaction medium used as solvent can be aromatic or a mixture of aromatic and aliphatic hydrocarbons, the latter one containing preferably 5-9 carbon atoms, more preferably 5-7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and is most preferably toluene. The molar ratio of said aromatic medium to magnesium is preferably less than 10, for instance from 4 to 10, preferably from 5 to 9. The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesium, alkyl magnesium alkoxides, alkyl magnesium halides and magnesium dihalides.

It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides. The magnesium dialkoxide may be the reaction product of a magnesium dihalide such as magnesium dichloride or a dialkyl magnesium of the formula R'xR"yMg, wherein x+y=2 and x and y are in the range of 0.3-1.7 and each one of R' and R" is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Preferably, R' is a butyl group and R" is an octyl group, i. e. the dialkyl magnesium compound is butyl octyl magnesium, most preferably the dialkyl magnesium compound is Mg[(Bu)$_{1.5}$(Oct)$_{0.5}$].

Dialkyl magnesium, alkyl magnesium alkoxide or magnesium dihalide can react with a polyhydric alcohol R(OH)$_m$, with m being in the range of 2-4, or a monohydric alcohol ROH or mixtures thereof. Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol. The aromatic reaction medium may also contain a monohydric alcohol, which may be straight or branched chain. Typical $C_1$-$C_5$ monohydric alcohols are methanol, ethanol, n-propanol, isopropanol, n-butanol, iso-butanol, sec. butanol, tert. butanol, n-amyl alcohol, iso-amyl alcohol, sec. amyl alcohol, tert. amyl alcohol, diethyl carbinol, akt. amyl alcohol, sec. isoamyl alcohol, tert. butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, 1-heptadecanol and n-1-octadecanol. The monohydric alcohols may be unsaturated, as long as they do not act as catalyst poisons. Preferable monohydric alcohols are those of formula ROH in which R is a $C_2$-$C_{16}$ alkyl group, most preferably a $C_4$-$C_{12}$ alkyl group, particularly 2-ethyl-1-hexanol or 1-octanol.

Preferably, essentially all of the aromatic carboxylic acid ester is a reaction product of a carboxylic acid halide, preferably a dicarboxylic acid dihalide, more preferably an unsaturated, dicarboxylic acid dihalide, most preferably phthalic acid dichloride, with the monohydric alcohol.

The compound of a fourvalent Group 4 metal containing a halogen is preferably a titanium tetrahalide. Equivalent to titanium tetrahalide is the combination of an alkoxy titanium halide and a halogenation agent, which are able to form a titanium tetrahalide in situ. The most preferred halide is the chloride.

As is known, the addition of at least one halogenated hydrocarbon during the procatalyst preparation process can lead to further improved catalytic activity. Reactive halogenated hydrocarbons preferably have the formula $R'''X'''_n$ wherein $R'''$ is a $C_1$-$C_{20}$ hydrocarbyl group, particularly a $C_1$-$C_{10}$ aliphatic hydrocarbyl group, $X'''$ is a halogen, preferably chlorine, and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2)-tetrachloroethane, pentachloroethane, hexachloroethane, 1-chloropropane, 2-chloropropane, (1,2)-dichloropropane, (1,3)-dichloropropane, (1 2,3) trichloropropane, 1-chlorobutane, 2-chlorobutane, isobutyl chloride, tert. butyl chloride, (1,4)-dichlorobutane, 1-chloropentane and (1,5)-dichloropentane. The chlorinated hydrocarbons may also be unsaturated, provided that the unsaturation does not act as catalyst poison in the final catalyst.

In the above formula, $R'''$ is preferably a $C_1$-$C_{10}$ alkyl group, $X'''$ is preferably chlorine and n is preferably 1 or 2. Preferred compounds include butyl chloride (BuCl), dichloroalkanes such as (1,4)-dichlorobutane, and tertiary butyl chloride.

The catalyst preparation as described herein can be carried out batchwise, semi-continuously or continuously. In such a semi-continuous or continuous process, the solution of the complex of the group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabiliser, and then the agitated emulsion is fed into a temperature gradient reactor, in which the emulsion is subjected to a temperature gradient, thus leading to solidifying the droplets of a dispersed phase of the emulsion. The TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst, which are formed in the temperature gradient reactor when passing through said line. Such additional solvent might be the same as the organic liquid reaction medium, which is used for preparing the solution of the complex of the group 2 metal as explained above in more detail.

The solidified particles of the catalyst can subsequently be recovered by an in-stream filtering unit and are preferably subjected to washing in order to remove unreacted starting components.

The recovered particulate product is washed at least once, preferably at least twice, most preferably at least three times with a hydrocarbon, which preferably is selected from aromatic and aliphatic hydrocarbons, preferably with toluene, particularly with hot (e.g. 90° C.) toluene, which may include a small amount, preferably about 0.01-10 vol % of $TiCl_4$ or an alkyl aluminium chloride, such as diethyl aluminium chloride (DEAC), in it. A further washing step is advantageously performed with heptane, most preferably with hot (e.g. 90° C.) heptane, and a still further washing step with pentane. A washing step typically includes several substeps. A favoured washing sequence is, for example, one washing step with toluene at 90° C., two washing steps with heptane at 90° C. and one or two washing steps with pentane at room temperature.

Finally, the washed catalyst is dried, e.g. by evaporation or flushing with nitrogen.

The catalyst system which is used according to the present invention also comprises a cocatalyst, preferably an aluminium alkyl compound, as defined in detail below. In case the procatalyst is produced by emulsion technology the cocatalyst is added, in pure form or in the form of a solution, from shortly before the beginning of the emulsion formation until adding it to the washing liquid, e. g. toluene, in such an amount that the final Al content of the particles is from 0.05 to 1 wt %, preferably 0.1 to 0.8 wt % and most preferably 0.2 to 0.7 wt % by weight of the final catalyst particles. The most preferred Al content may vary depending upon the type of the Al compound and on the adding step. For example, in some cases the most preferred amount may be 0.1 to 0.4 wt %.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the polypropylene random copolymer (PP-RACO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

As mentioned above, for the production of the polypropylene random copolymer (PP-RACO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \tag{III}$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More specific examples of the hydrocarbyloxy silane compounds which are useful as external electron donors in the invention are diphenyldimethoxy silane, dicyclopentyldimethoxy silane (D-Donor), dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane (C-Donor), cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the organo silane compounds are diethylamino-triethoxy-silane (U-Donor), cyclohexylmethyl dimethoxy silane (C-Donor), or dicyclopentyl dimethoxy silane (D-Donor), the latter especially preferred.

The additives as stated above are added afterwards to the polypropylene random copolymer (PP-RACO), which is collected from the final reactor of the polymer production process. Preferably, these additives are mixed into the polypropylene random copolymer (PP-RACO) or during the extrusion process in a one-step compounding process. Alternatively, a master batch may be formulated, wherein the polypropylene random copolymer (PP-RACO) is first mixed with only some of the additives.

The properties of the polypropylene random copolymer comprising ethylene and/or $C_4$ to $C_8$ α-olefin (PP-RACO), produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

For mixing the individual components of the instant fiber reinforced composition, a conventional compounding or blending apparatus, e.g. a Banbury mixer, a 2-roll rubber mill, Buss-co-kneader or a twin screw extruder may be used. Preferably, mixing is accomplished in a co-rotating twin screw extruder. The polymer materials recovered from the extruder are usually in the form of pellets. These pellets are then preferably further processed, e.g. by injection molding to generate articles and products of the inventive fiber reinforced composition.

The present invention also relates to automotive articles comprising the fiber reinforced composition as defined above.

In addition, the present invention also relates to a process for the preparation of the fiber reinforced composition as described above, comprising the steps of adding
(a) polypropylene random copolymer (PP-RACO),
(b) the fibers (F), and
(c) the polar modified polypropylene as adhesion promoter (AP)
to an extruder and extruding the same obtaining said fiber reinforced composition.

The fiber reinforced composition according to the invention may be pelletized and compounded using any of the variety of compounding and blending methods well known and commonly used in the resin compounding art.

The composition of the present fiber reinforced composition can be used for the production of molded articles, preferably injection molded articles as well as foamed articles. Even more preferred is the use for the production of parts of washing machines or dishwashers as well as automotive articles, especially of car interiors and exteriors, like instrumental carriers, shrouds, structural carriers, bumpers, side trims, step assists, body panels, spoilers, dashboards, interior trims and the like.

According to a preferred embodiment, the article is a foamed article comprising the fiber reinforced composition described above.

Examples of such foamed articles for automotive applications are instrumental carriers, shrouds, or structural carriers.

Appropriate preparation methods of foamed articles, either by chemical or physical foaming, are commonly known to the skilled person.

EXAMPLES

1. Definitions/Measuring Methods

Figure 1:
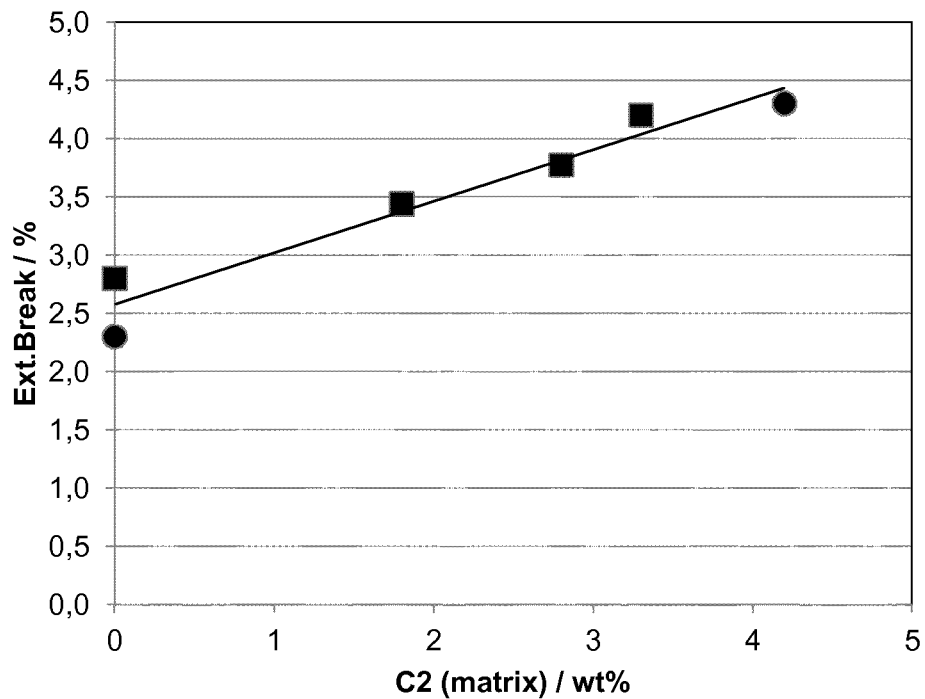
FIG. 1: relation between matrix ethylene (C2) content of the inventive examples (square symboles) and the extensibility ($\epsilon_B$) of the composites respectively; round symbols indicate compositions with a higher GF content
Figure 2:
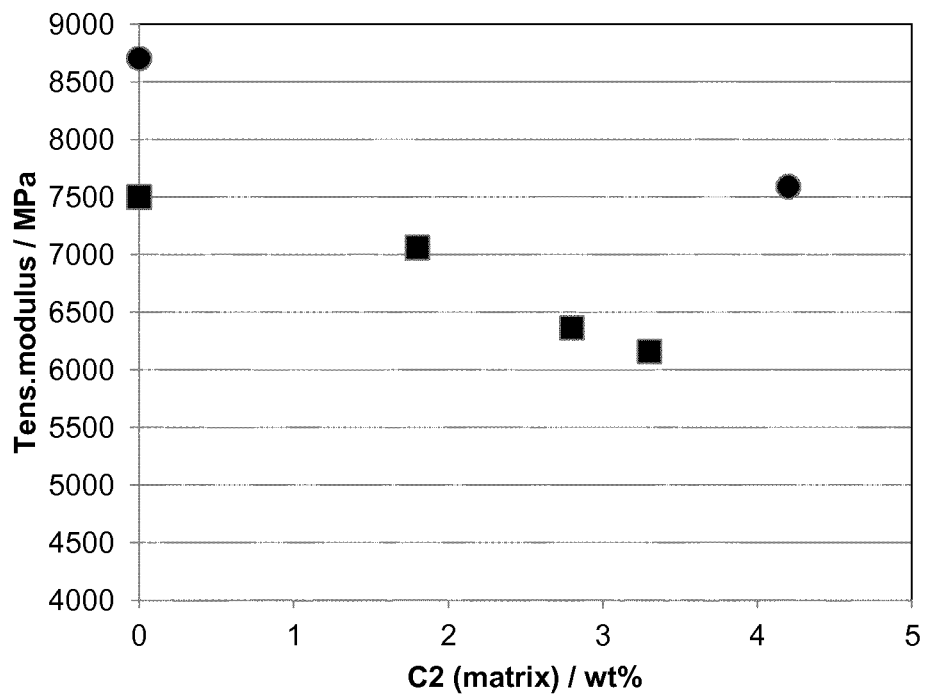
FIG. 2: relation between matrix ethylene (C2) content of the inventive examples (square symboles) and the tensile modulus; round symbols indicate compositions with a higher GF content The present invention will now be described in further detail by the examples provided below.

The following definitions of terms and determination methods apply for the above general description of the invention as well as to the below examples unless otherwise defined.

Density is measured according to ISO 1183-187. Sample preparation is done by compression molding in accordance with ISO 1872-2:2007

Melting temperature Tm is measured according to ISO 11357-3

$MFR_2$ (230° C.) is measured according to ISO 1133 (230° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

Tensile Modulus; Elongation at break; Yield Stress are measured according to ISO 527-2 (cross head speed=50 mm/min; 23° C.) using injection molded specimens as described in EN ISO 1873-2 (dog bone shape, 4 mm thickness).

Charpy impact test: The Charpy (notched) impact strength (Charpy NIS/IS) is measured according to ISO 179 2C/DIN 53453 at 23° C., using injection molded bar test specimens of 80×10×4 $mm^3$ prepared in accordance with ISO 294-1:1996.

The xylene solubles (XCS, wt.-%): Content of xylene cold solubles (XCS) is determined at 25° C. according ISO 16152; first edition; 2005 Jul. 1.

Average Fiber Diameter:

Determined according to ISO 1888:2006(E), Method B, microscope magnification of 1000.

2. Examples

The following inventive examples IE1 to IE4 and comparative examples CE1 and CE2 were prepared by compounding on a co-rotating twin-screw extruder with a screw configuration typical for glass fibre mixing using a temperature range between 200 and 240° C.

TABLE 1

Overview of composition and mechanics for inventive and comparative examples

|  |  | IE 1* | IE 2* | IE 3* | IE 4* | CE 1* | CE 2* |
|---|---|---|---|---|---|---|---|
| PP-1 | [wt.-%] |  |  |  |  | 42.8 |  |
| PP-2 | [wt.-%] |  |  |  |  | 15.0 |  |
| PP-3 | [wt.-%] |  |  |  |  | 6.0 |  |
| PP-4 | [wt.-%] |  |  |  |  |  | 59.1 |
| PP-RACO-1 | [wt.-%] | 62.5 |  |  |  |  |  |
| PP-RACO-2 | [wt.-%] |  | 62.5 |  |  |  |  |
| PP-RACO-3 | [wt.-%] |  |  | 62.5 |  |  |  |
| PP-RACO-4 | [wt.-%] |  |  |  | 56.1 |  |  |
| GF-1 | [wt.-%] | 32.0 | 32.0 | 32.0 | 40.0 | 32.0 |  |
| GF-2 | [wt.-%] |  |  |  |  |  | 38.0 |
| AP-1 | [wt.-%] |  |  |  | 2.0 | 1.5 | 2.0 |
| AP-2 | [wt.-%] | 1.5 | 1.5 | 1.5 |  |  |  |
| MB-1 | [wt.-%] |  |  |  |  | 0.7 |  |
| MB-2 | [wt.-%] | 2.0 | 2.0 | 2.0 | 1.9 |  |  |
| $MFR_2$ | [g/10 min] | 4.2 | 16.6 | 6.2 | 21 | 4.0 | 31 |
| C2 | [wt.-%] | 1.8 | 2.8 | 3.3 | 4.2 | 0.0 | 0.0 |
| TM | [MPa] | 7060 | 6362 | 6158 | 7589 | 7500 | 8702 |
| TS | [MPa] | 100 | 95 | 90 | 99 | 110 | 126 |
| EB | [%] | 3.4 | 3.8 | 4.2 | 4.3 | 2.8 | 2.3 |
| NIS | [kJ/m$^2$] | 9.4 | 9.3 | 9.4 | 11.9 | 12.0 | 12.6 |

*remaining part up 100 wt.-% are typical additives like antioxidants.

TM tensile modulus
TS tensile strength
EB elongation at break
NIS Charpy impact (notched)
PP-1 is the commercial propylene homopolymer "HG265FB" of Borealis AG with an $MFR_2$ of 26 g/10 min, a melting temperature of 161° C., and a density of 0.905 g/cm$^3$;
PP-2 is the commercial propylene homopolymer "HJ120UB" of Borealis AG with an $MFR_2$ of 75 g/10 min, a melting temperature of 164° C., and a density of 0.905 g/cm$^3$;
PP-3 is the commercial propylene homopolymer "BE50" of Borealis AG with an $MFR_2$ of 0.3 g/10 min, a melting temperature of 164° C., and a density of 0.905 g/cm$^3$;
PP-4 is the commercial propylene homopolymer "HL512FB" of Borealis AG with an $MFR_2$ of 0.3 g/10 min, and a density of 0.905 g/cm$^3$;
PP-RACO-1 is a polypropylene random copolymer (PP-RACO) with an $MFR_2$ of 14 g/10 min, a melting temperature of 155° C., an ethylene content of 1.8 wt.%, and a XCS content of 2.3 wt.-%;
PP-RACO-2 is the commercial polypropylene random copolymer (PP-RACO) "RJ470MO" of Borealis AG with an $MFR_2$ of 70 g/10 min, a melting temperature of 150° C., an ethylene content of 2.8 wt.-%, a XCS content of 5 wt.-%, a density of 905 kg/m$^3$, and a tensile modulus of 1,200 MPa;
PP-RACO-3 is the commercial polypropylene random copolymer (PP-RACO) "RF366MO" of Borealis AG with an $MFR_2$ of 20 g/10 min, a melting temperature of 151° C., an ethylene content of 3.3 wt.-%, a XCS content of 6.0 wt%, a density of 905 kg/m$^3$, and a tensile modulus of 1,200 MPa;
PP-RACO-4 is a polypropylene random copolymer (PP-RACO) with an $MFR_2$ of 112 g/10 min, a melting temperature of 152° C., an ethylene content of 4.1 wt.-%, and a XCS content of 10 wt.-%;
GF-1 are the commercial glass fibers "Thermo Flow ® Chopped Strand 636 for PP" of Johns Manville, which are E-glass fibers coated with a silane based sizing, a length of 4 mm, and an average diameter of 13 µm;
GF-2 are the commercial glass fibers "Vetrotex EC13 P968" of Saint-Gobain Vetrotex International, Germany, which is a short-cut glass fiber with 13 µm average fibre diameter and 6 mm length being surface coated;
AP-1 is the commercial maleic anhydride functionalized polypropylene "Exxelor PO1020" of Exxon Mobil with a density 0.9 g/cm$^3$, an $MFR_2$ of 430 g/10 min and an MAH content of 1.0 mol.-%;
AP-2 is the commercial maleic anhydride functionalized polypropylene "Scona TPPP 2112FA" of Kometra GmbH, Germany with a density of 0.9 g/cm$^3$, having an $MFR_2$ of 5 g/10 min and an MAH content of 1.2 mol.-%.
MB-1 is the commercial carbon black masterbatch "CMB 520 black 7 - PE 30" of QolorTech bv, Netherlands, consisting of 30 wt.-% Pigment Black 7, 40 wt.-% CaCO$_3$, and 30 wt.-% LDPE
MB-2 is the commercial carbon black masterbatch "Plasblak PE4103" of Cabot Corporation, Germany PP-RACO-1 has been produced as follows:

The catalyst used in the polymerization process of PP-RACO-1 has been produced as follows: First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethylaluminium (TEAL) and as donor dicyclo pentyl dimethoxy silane (D-donor) was used. The aluminium to donor ratio was 5 mol/mol. Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

PP-RACO-4 has been produced as follows:

The catalyst used is described on page 25 of WO2009/040201. As cocatalyst triethyl aluminium (TEAl) and as external donor cyclohexyl methyl dimethoxy silane (C-Donor)) have been used.

TABLE 2

Preparation of PP-RACO-1 and PP-RACO-4

|  |  | PP-RACO-1 | PP-RACO-4 |
|---|---|---|---|
| Donor | [—] | D | C |
| Prepol |  |  |  |
| T | [° C.] | 25 | 30 |
| p | [bar] | 52 | 54 |
| $t_{RES}$ | [h] | 0.35 | 0.35 |
| $C_2$ | [wt-%] | 0 | 0 |
| Loop |  |  |  |
| T | [° C.] | 65 | 70 |
| p | [bar] | 55 | 56 |
| $t_{RES}$ | [h] | 0.38 | 0.38 |
| $MFR_2$ | [g/10 min] | 19 | 105 |
| $C_2$ | [wt.-%] | 1.35 | 1.2 |
| XCS | [wt.-%] | 2.4 | 3.0 |
| GPR |  |  |  |
| T | [° C.] | 80 | 80 |
| p | [bar] | 23 | 25 |
| $t_{RES}$ | [h] | 1.1 | 1.07 |
| $MFR_2$ | [g/10 min] | 14 | 110 |
| $C_2$ | [wt-%] | 1.8 | 4.1 |
| XCS | [wt-%] | 2.3 | 10.0 |
| Split Loop/GPR | [%] | 56/44 | 50/50 |

Prepol defines pre-polymerization
Loop defines the polypropylene fraction (A)
GPR defines the propylene copolymer fraction (B)
$C_2$ is ethylene content
T is the temperature within the reactor
p is the temperature within the reactor
$t_{RES}$ is the average residence time in the reactor

The invention claimed is:

1. Fiber reinforced composition consisting essentially of:
   (a) a polypropylene random copolymer comprising ethylene and/or $C_4$ to $C_8$ α-olefin (PP-RACO),
   (b) fibers (F), and (c) a polar modified polypropylene as adhesion promoter (AP),
(d) optionally a masterbatch, and
(e) optionally one or more additives,
wherein;
   (i) the polypropylene random copolymer comprising ethylene and/or $C_4$ to $C_8$ α-olefin (PP-RACO) having a melt flow rate $MFR_2$ (230 °C.) measured according to ISO 1133 of at least 5 g/10min,
   (ii) the fibers (F) are selected from the group consisting of glass fibers, metal fibers, ceramic fibers and graphite fibers, and
   (iii) the complete polymer contained in the reinforced composition forms a continuous phase being the matrix of the fiber reinforced composition.

2. Fiber reinforced composition according to claim 1, wherein the polypropylene random copolymer (PP-RACO) comprises 1.0 to 5.0 wt. % of ethylene and/or $C_4$ to $C_8$ α-olefin.

3. Fiber reinforced composition according to claim 1, wherein the polypropylene random copolymer (PP-RACO) has a xylene cold soluble content (XCS) measured according ISO 16152 (23° C.) of not more than 20wt. %.

4. Fiber reinforced composition according to claim 1, wherein the polypropylene random copolymer (PP-RACO) has a monomodal, bimodal or multimodal molecular weight or comonomer distribution.

5. Fiber reinforced composition according to claim 1, wherein the overall melt flow rate $MFR_2$ (230° C.) measured according to ISO 1133 is at least 4 g/10min.

6. Fiber reinforced composition according to claim 1, wherein the overall tensile modulus is at least 5000 MPa.

7. Fiber reinforced composition according to claim 1, wherein the fibers (F) are glass fibers.

8. Fiber reinforced composition according to claim 1, wherein the composition consists essentially of:
(a) 30 to 75 wt. % of a polypropylene random copolymer comprising ethylene and/or $C_4$ to $C_8$ α-olefin (PP-RACO),
(b) 20 to 45 wt. % fibers (F), and
(c) 0.5 to 5.0 wt. % of a polar modified polypropylene as adhesion promoter (AP),
(d) 0.0 to 3.0 wt. % of a masterbatch,
(e) 0.0 to 3.0 wt. % of one or more additives, based on the total weight of the fiber reinforced composition.

9. Automotive article comprising the fiber reinforced composition according to claim 1.

10. A foamed article, comprising the fiber reinforced composition according to claim 1.

11. Process for the preparation of the fiber reinforced composition according to claim 1, comprising the steps of adding:
(a) polypropylene random copolymer (PP-RACO),
(b) the fibers (F), and
(c) the polar modified polypropylene as adhesion promoter (AP) to an extruder and extruding the same obtaining said fiber reinforced composition.

\* \* \* \* \*